United States Patent [19]

Guile

[11] Patent Number: 5,183,608
[45] Date of Patent: Feb. 2, 1993

[54] METHOD OF MAKING DIESEL PARTICULATE FILTERS

[75] Inventor: Donald L. Guile, Horseheads, N.Y.

[73] Assignee: Corning Incorporated, Corning, N.Y.

[21] Appl. No.: 816,226

[22] Filed: Jan. 3, 1992

[51] Int. Cl.$^5$ .............. B29C 47/00; C04B 33/32; C04B 35/64; C04B 41/81

[52] U.S. Cl. .......................... 264/44; 264/60; 264/63; 264/177.11; 264/177.12; 264/211; 264/211.11; 264/267; 264/DIG. 48

[58] Field of Search .............. 264/44, 43, 63, 66, 264/60, 59, 177.11, 177.12, DIG. 48, 211, 211.11, 267, 269

[56] References Cited

U.S. PATENT DOCUMENTS

| | | | |
|---|---|---|---|
| 3,880,969 | 4/1975 | Lato | 264/44 |
| 3,899,555 | 8/1975 | Takao et al. | 264/44 |
| 3,943,213 | 3/1976 | Whittaker et al. | 264/DIG. 19 X |
| 4,059,423 | 11/1977 | DeVos et al. | 264/43 X |
| 4,200,558 | 4/1980 | Holst et al. | 264/187 X |
| 4,221,594 | 9/1980 | Greskovich et al. | 264/44 X |
| 4,385,129 | 5/1983 | Inoguchi et al. | 501/118 |
| 4,455,180 | 6/1984 | Hillman et al. | 264/60 X |
| 4,508,841 | 4/1985 | Onuma et al. | 264/44 X |
| 4,552,852 | 11/1985 | Manning | 264/60 X |
| 4,563,432 | 1/1986 | Ehlert et al. | 264/44 X |
| 4,806,206 | 2/1989 | Kamijo et al. | 264/60 X |
| 5,069,697 | 12/1991 | Hamaguchi et al. | 264/44 X |
| 5,087,277 | 2/1992 | Gonzalez et al. | 264/44 X |

FOREIGN PATENT DOCUMENTS

| | | | |
|---|---|---|---|
| 0274815 | 11/1989 | Japan | 264/44 |
| 2093816 | 9/1982 | United Kingdom | 264/44 |

*Primary Examiner*—Karen Aftergut
*Attorney, Agent, or Firm*—Scott M. Terrillion; Richard N. Wardell

[57] ABSTRACT

Porous ceramic articles are made by a method that allows the formed green body to be dried in a dielectric oven without arcing or shorting occurring while maintaining favorable physical properties. The method includes adding water insoluble cellulose and graphite to the ceramic-forming precursors as a burnout material. The method is particularly useful in forming porous cordierite articles that are extruded to form a honeycomb structure conventionally used as a particulate filter for the exhaust fluids of diesel engines. Such articles have a matrix of thin walls forming a multiplicity of open-ended cells extending from one end to another end of the honeycomb. The thin walls have a substantially smaller coefficient of thermal expansion in the direction parallel to the axes of the open-ended cells than in the direction transverse to the thin walls.

18 Claims, No Drawings

METHOD OF MAKING DIESEL PARTICULATE FILTERS

FIELD OF INVENTION

The present invention relates to a method of making a porous ceramic article suitable for use as a diesel particulate filter and capable of being substantially dielectrically dried.

BACKGROUND OF THE INVENTION

It is well known that solid particulates and larger particles may be filtered from fluids (i.e., gases and/or liquids) by passing the particulate contaminated fluids through porous, walled honeycomb structures. U.S. Pat. No. 4,329,162 describes and claims honeycomb filters for removing carbonaceous solid particulates from diesel engine exhausts and other filtering applications. A typical diesel particulate filter ("DPF") has a multiplicity of interconnected thin porous walls which define at least one inlet surface and one outlet surface on the filter and a multiplicity of hollow passages, or cells, extending through the filter from an inlet surface or an outlet surface or both. Inlet cells are open at least one inlet surface to admit contaminated fluid into the filter. The inlet cells are closed where they adjoin any outlet surface of the filter. Outlet cells are formed open at an outlet surface to discharge fluid which has passed through the filter. The outlet cells are similarly closed where they adjoin any inlet surface. The interconnected thin walls are provided with an internal interconnected open porosity which allows the fluid to pass from the inlet to the outlet cells while restraining a desired portion of the solid particulates in the fluid.

The particulates are trapped in or collected on the surfaces of the thin walls defining the inlet cells. As the mass of collected particulates increases, back pressure across the filter increases and/or the flow rate of fluid through the filter decreases until an undesirable level of back pressure and/or flow rate is reached and the filter either is regenerated by removal of the trapped particulates or discarded. DPFs are typically installed in a housing which, like a muffler or catalytic converter, is inserted into the exhaust system of a diesel engine equipped vehicle.

To produce the required porosity in a ceramic substrate to be used as a particulate filter, a "burnout" material is commonly added to and mixed with ceramic precursors prior to firing. This pore-forming material is burned out when the ceramic precursors are fired to produce the hardened ceramic body. The most common burnout material used in ceramic articles is graphite because it produces pores of optimal size and good overall porosity without swelling which can cause cracking or weakening of the ceramic article.

Although ceramic ware prepared with up to 30 weight percent graphite exhibit acceptable physical properties, graphite burnout material is not without disadvantages. The most severe problem is the inability completely to dry graphite-containing ceramic ware dielectrically. A dielectric dryer utilizes a pair of opposing plates or electrodes to create a high frequency electrical field between the plates or electrodes. This "dielectric" field couples with the water in the ware, resulting in absorption of energy by the water. This energy absorption results in heating and evaporation of the water in the ware. Dielectric drying is the preferred method of drying ceramic ware because of the speed and uniformity with which the ceramic articles are dried. In addition, dielectric drying decreases cracking of the article during drying and increases the dimensional accuracy of the finished ware.

It has been found, however, that if the formed ceramic substrates containing a high level of graphite are dried dielectrically beyond some point (and before drying is complete), arcing or shorting takes place between the electrodes of the dryer and the ceramic ware. Arcing in the dielectric dryer can cause many problems including burning of the ware, cracking, or damage to the dryer. Also, because the ware cannot be fully dried dielectrically, drying must generally be completed in a conventional hot air oven. Due to the size of the ware typically used as particulate filters and non-uniformity of drying, considerable cracking of the ceramic can occur during hot air drying. Lastly, the use of graphite to develop porosity in the ceramic article results in a large exothermic reaction when the graphite is burned out. The reaction causes the inside of the ware to get much hotter than the outside during firing. These severe thermal gradients are another cause of cracking.

Therefore, although the use of graphite as a burnout material has resulted in ceramic wares exhibiting good physical properties, there continues to be a need to improve the method of producing dimensionally accurate, durable porous ceramic substrates.

SUMMARY OF THE INVENTION

The present invention relates to an improved method of making porous ceramic articles suitable for use as, for example, filters to remove suspended particulates from the exhaust gas of diesel engines. It has been discovered, in accordance with the present invention, that reducing the level of graphite burnout material will prevent arcing during dielectric drying of the ceramic article. Unexpectedly, the substitution of graphite with an amount of water insoluble cellulose will allow the ceramic article to be dried dielectrically without arcing or shorting and, therefore, without the need for an additional "hot air" drying step.

The present method of making a porous ceramic article comprises the steps of blending ceramic-forming precursors, graphite, and water insoluble cellulose with a vehicle and other desired forming aids to form a plastic mixture, forming the plastic mixture into a green body, dielectrically drying the green body, and firing the dried green body to form the desired porous ceramic article.

The method of the present invention can be used to make a porous cordierite article. Graphite and water insoluble cellulose, and ceramic-forming precursors in amounts suitable to form an analytical batch composition by weight on an oxide basis of 9–20% MgO, 30–50% Al$_2$O$_3$, and 41–56.5% SiO$_2$ are blended with a vehicle and other desired forming aids to form a plastic mixture. The plastic mixture is anisostatically formed into a green honeycomb and the green honeycomb is dielectrically dried. The dried green honeycomb is then fired under conditions effective to form a ceramic body consisting essentially of cordierite.

The method of the present invention is particularly useful to make diesel particulate filters. Graphite, water insoluble cellulose, and ceramic-forming precursors in amounts effective to form a cordierite article are blended with a vehicle and forming aids to form a plastic mixture. The plastic mixture is anisostatically extruded to form a green honeycomb which is dielectrically dried and fired to form a cordierite article. The fired cordierite honeycomb is plugged and refired to form a diesel particulate filter.

The substitution of a portion of the graphite burnout material with water insoluble cellulose allows the ceramic article to be completely dried dielectrically without arcing or shorting, while maintaining the desirable overall porosity and average pore size. Porous ceramic articles manufactured by the present process also exhibit a low incidence of cracking during drying. In addition, the use of a combination of cellulose and graphite also reduces the level of heat generated during any part of the firing because the cellulose burns out at a lower temperature than graphite. Therefore, any thermal gradients present will be spread out over a longer portion of the firing schedule and will reduce the thermal stresses accordingly. This, in turn, reduces the incidence of cracking during firing.

DETAILED DESCRIPTION OF THE INVENTION

In accordance with the present method, a new method of making a porous ceramic article is disclosed. The porous ceramic article formed by the method of the present invention is especially useful as a diesel particulate filter. The preferred embodiments disclosed below are, therefore, directed to that application of the present invention. Essentially, the method of the present invention includes the steps of blending graphite and water insoluble cellulose with ceramic-forming precursors and an effective amount of vehicle and forming aids to form a plastic mixture. The plastic mixture is formed into a green body and dielectrically dried. The dried green body is then fired to form a porous ceramic article.

The selection of the ceramic-forming precursors which will comprise the ceramic batch will depend on the desired fired composition. Any combination of ceramic-forming precursors that may be fired to form, for example, alumina, mullite, cordierite, zircon, silicon nitride, silicon carbide, spinel, zirconia, or forsterite, may be used as the ceramic-forming precursors of the present invention.

Cordierite ceramic materials are generally preferred for diesel particulate filters due to their durability under the extreme temperatures and other physical or chemical conditions present in diesel engines. Exemplary cordierite ceramic materials and methods of making cordierite-containing honeycomb structures useful in the method of the present invention are disclosed in U.S. Pat. Nos. 3,885,977 and 4,001,028, the disclosures of which are hereby incorporated by reference. A particularly preferred method of making cordierite-containing ceramic articles is disclosed in my copending U.S. patent application Ser. No. 07/816,228 entitled "Modified Cordierite Precursors", filed Jan. 3, 1992.

Typically, to form a cordierite ceramic article, talc, silica, alumina, aluminum hydroxides, and magnesia-yielding chemicals are used with the proportions of clay, talc, silica, aluminum hydroxides, and alumina chosen to produce cordierites analytically consisting essentially of 41–56.5% $SiO_2$, 30–50% $Al_2O_3$, and 9–20% MgO. The total weight of MgO, $Al_2O_3$, and $SiO_2$ is preferably at least 95% of the entire weight of the ceramic article.

The crystals of cordierite, in accordance with the present invention, become preferentially oriented during the firing process. It is believed that this is accomplished by the use of raw materials in the form of flat, planar particles (i.e., platelets) rather than large isodimensional particles. Suitable platey materials are found in various talcs and delaminated clays, such as delaminated kaolin.

The term platelet refers to the shape and geometry of a particle of material. The particle has two long dimensions and one short dimension—i.e. the length and width of the platelet are much larger than its thickness. The length and width need not be equal, but they must be much greater than the thickness of the platelet.

The ceramic-forming precursors must be blended with an amount of water insoluble cellulose and graphite. As stated above, the cellulose and graphite serve as burnout material to achieve the requisite porosity in the ceramic article manufactured in accordance with the present invention. Any combination of graphite and water insoluble cellulose that provides the requisite physical properties and allows the formed green body to be dried dielectrically without arcing or shorting may be used.

Generally, as the amount of water insoluble cellulose is increased, the amount of graphite should be decreased to maintain the desired overall porosity and optimal pore size. For the purposes of this invention, overall porosity is defined as the porosity within the walls of the substrate and does not include the open channels. Cellulose will generally produce about twice the porosity of a like amount of graphite. It is also desirable to keep the graphite level as high as possible without causing arcing or shorting during drying to prevent cracking due to the tendency of cellulose to swell. Preferably, about 10 to about 20 parts by weight graphite and about 4 to about 12 parts by weight cellulose should be added to 100 parts by weight of ceramic-forming precursors. The addition of about 15 to about 20 parts by weight graphite coupled with about 8 to about 10 parts by weight cellulose to 100 parts by weight ceramic-forming precursors is especially useful.

The graphite may either be natural or synthetic. The average particle size and distribution of the graphite particles used in the method of the present invention may vary depending on, for example, the desired pore size after burnout. In general, the larger the particle size, the larger the pores. It is undesirable to achieve the requisite level of porosity using large pores (i.e., a ware having a mean pore diameter greater than 30 $\mu$m) because large pores decrease the strength of the final ceramic product. For a diesel particulate filter, it is preferred to have an overall porosity in the range of about 45 to about 55 percent and a mean pore diameter of about 8 to about 30 $\mu$m. Especially preferred is a mean pore diameter of about 10 to about 30 $\mu$m. Preferably the particle size of the graphite used to achieve the requisite porosity is in the range of about 5 to about 30 $\mu$m, especially preferred graphite particles have a particle size of about 11 to 26 $\mu$m. In addition, the mean pore diameter used to achieve the desired overall porosity may be adjusted by using a coarser (i.e., larger average particle size) talc. The use of a coarser talc to adjust the mean pore diameter of the ware will not adversely affect the fired product.

The water insoluble cellulose used in the present method may come from a wide variety of sources. For example, wood fiber or pulp, vegetable fibers, cotton fibers, or synthetic cellulose are all suitable sources of cellulose. As discussed supra relative to graphite, the particle size of the cellulose added to the ceramic precursors may vary depending on, for example, the desired pore size after burnout. Preferably, the particle size of the cellulose is generally equivalent to the particle size of the graphite. An especially preferred cellulose for use in manufacturing diesel particulate filters is ALPHA-CEL TM C-100 cellulose, sold by International Filler Corp., North Tonawanda, N.Y. ALPHA-CEL TM C-100 cellulose has the following particle size, as determined by screen analysis: 97–100 weight percent through 100 mesh, 55–60 weight percent through 200 mesh (United States Std. Sieve).

The mixture of ceramic-precursors, water insoluble cellulose, and graphite is blended with vehicle and extrusion aids to achieve sufficient plastic flow to orient the platelets properly. Any suitable vehicle known in the art may be used in the method of the present invention. Water is a preferred vehicle. Extrusion aids, such as methylcellulose and sodium stearate, are also added in sufficient quantities to give the mixture formability and green strength prior to firing. Water, which also aids plastic formability, should be utilized at a level of 15–36 parts by weight to 100 parts by weight of dry material.

Once a blend of raw materials in a plastically formable state is prepared, it can be subjected to a plastic flow or extrusion step which orients clay and talc platelets in the green body. In forming structures with thin web and thin ribbon material, the desired orientation of clay and talc platelets is in the plane of the webs. Other forming methods such as rolling and pressing of sheets, which may be assembled into honeycomb structures, can similarly be produced with a favorable orientation.

In conventional isostatic forming methods, clay and talc particles of the batch tend to be left in the same orientation imparted during mixing and preforming preparation. By contrast, the present anisostatic method does not apply equal forces to all parts of the body being formed, and, therefore, the clay and talc platelets are caused to slip and rotate in the plastic batch while trying to reach a planar orientation. In pressing or extruding a ribbon of material, for example, the orientation results in an ideal configuration of the c-axis of the clay. The resulting cordierite crystals are oriented, after firing, to have the low expansion c-axes lying preferentially in the plane of the ribbon and the high expansion a-axes oriented transverse to that plane and parallel to the thin dimension.

When forming an open celled, thin walled honeycomb structure, in accordance with the present invention, cordierite is oriented to have a low expansion along the axes of the cells and a high expansion across the thin wall (but not across the entire body normal to the cell axes). The effect of the high expansion direction is minimal, because the internal spaces in honeycomb allow expansion of the thin walls into the cells. A typical honeycomb structure useful with the present invention has a wall thickness of between about 0.076 and about 1.27 millimeters with cell densities of between about 1.4 cells/square centimeter to about 144 cells/square centimeter. The thickness of the thin walls is not critical for achieving proper orientation, but thinner walls enable more complete and more consistent planar orientation. A particularly preferred honeycomb structure for use as a diesel particulate filter is disclosed in U.S. Pat. No. 4,329,162 to Pitcher, Jr.

Besides honeycomb structures, other shapes can be extruded or otherwise formed, and the anisotropy of the expansion will be controlled by the orientation imparted to the clay platelets during forming.

The formed green body is dielectrically dried. Dielectric drying can be done in a dielectric oven having electrodes on either side of or above and below the green body. In accordance with the present invention, the green body may be dried completely in a dielectric oven, dispensing with a need for an additional drying step in a hot air oven, for example. For the purposes of this invention, a completely dried green body can still have some moisture content. To be completely dried, the green body should be dried to remove all the water that surrounds the particles during the extrusion and most of the interstitial water between the particles after the particles come in contact. Interstitial water is the water in the remaining voids between the tightly packed particles. There may be a small amount of water adsorbed on the particle surfaces, however. As is known in the art, this small amount of water does not adversely affect the physical properties of the resulting ceramic ware.

The firing range for the formed cordierite body should be 1340°–1440° C. with a soak time sufficient to yield a substantially complete reaction to the cordierite phase. Soak times of 6–12 hours may be used.

It is also possible to form cordierite bodies without clay or talc from a blend of 12–16 wt % magnesium oxide, 35–41 wt % aluminum oxide, and 43–53 wt % silica, as taught by U.S. patent application Ser. No. 07/654,528 entitled "Fabrication of Cordierite Bodies", now U.S. Pat. No. 5,114,644. Once forming aids are added to this blend to form a green body, the body can be dried and fired to form a cordierite-containing article. Such firing is carried out by heating to a temperature of 1000°–1200° C. and increasing that temperature at a rate of 100° C./hour to a level of 1350° to 1450° C.

The fired ceramic honeycomb can be plugged and refired to enhance the article's filtering properties. In a preferred embodiment, alternate cells of a honeycomb article such as described in U.S. Pat. No. 4,329,162 to Pitcher are plugged adjacent to each endface in a checkered-style pattern such that those cells plugged at the inlet end face are open at the outlet end face and vice versa. Plugs can be formed by injecting a plastically formable ceramic cement into the desired cell ends with an air-operated sealant gun. The amount of plugging cement injected into the cell ends can be controlled by measuring the time that operative air pressure is applied to the sealant gun. The depth or length a plug extends into the cell can vary widely. Useful lengths are in the range of about 5 to 15 mm, preferably about 9.5 to 13 mm.

The plugging cement used in the present method can be any known foaming or nonfoaming ceramic cement. Preferably, the ceramic cement should be durable in the face of high heat as well as the chemical and physical conditions typically encountered in modern exhaust systems. Preferably, a foaming cement is used to counteract the drying and firing shrinkage which commonly occurs when using nonfoaming cements. Preferred ceramic cements are disclosed in U.S. Pat. No. 4,329,162 to Pitcher and U.S. Pat. No. 4,297,140 to Paisley.

After injecting the ceramic cement, the previously fired ceramic article is refired. This firing is carried out by heating to a temperature of about 1350° to 1440° C. within 60 hours.

EXAMPLES

Preparation of all experimental Samples 1-63 followed one basic procedure. The basic experimental batch was about 1000 grams in weight for the oxide and mineral portions of the batch. Because the batches were not normalized back to 100 parts in every instance, this number is not always exact depending on the type of raw material used. The batch was weighed into a large, wide mouth NALGENE® bottle, sold by Nalgene Co., a subsidiary of Sybron Corp., Rochester, N.Y., followed by the addition of binder, methylcellulose, and the extrusion aid. The bottle was then placed in a TURBULA® mixer, sold by Glen Mills, Inc., Maywood, N.J., to dry blend for approximately 10 minutes.

After the batch ingredients were mixed, they were transferred into a mix muller pan. The muller had a mixer wheel and scrapers to keep the wet batch from sticking on the pan or wheel. The mixer was started and water was added slowly while mixing. After all the water was added, mixing was continued to plasticize the batch. Because of the size of the muller, the batch generally formed small granules rather than large plastic masses. After plasticizing, the batch was extruded.

Extrusion of Samples 1-50 was carried out on a small, ram-type extruder. The batch was first passed through a noodle dye using vacuum deairing to remove air from the batch material. This was done twice by placing the material back into the extruder barrel. After two passes, the die was changed to a 16 cells per square centimeter, 0.432 millimeter wall thickness die. Again, the barrel was deaired and 3.12 centimeter diameter pieces were made. The extruded green bodies were wrapped in foil to prevent rapid drying of the surface and then placed in a hot-air drying oven to dry over a two day period. The samples were cut to approximately 7.5 centimeter lengths and placed into alumina setter boxes. The length of each sample was measured before and after firing and the firing shrinkage was calculated. The firing was carried out in a gas fired, Bickeey-type 3000 kiln. The schedule used was a standard automotive 64 hour firing schedule, which is shown below:

25°-200° C. in 2.0 hours;
200°-325° C. in 5.0 hours;
325°-450° C. in 2.5 hours;
450°-600° C. in 6.5 hours;
600°-900° C. in 3.0 hours;
900°-1100° C. in 4.0 hours;
1100°-1130° C. in 2.0 hours;
1130°-1160° C. in 2.0 hours;
1160°-1265° C. in 4.0 hours;
1265°-1320° C. in 3.0 hours;
1320°-1390° C. in 6.0 hours;
Hold @ 1390° C. for 8.0 hours;
1390°-650° C. in 8.0 hours;
650°-100° C. in 5.0 hours.

Extrusion of Samples 51-54 was carried out on a large ram extruder. Web articles having a 14.15 centimeter diameter, 16 cells/square centimeter, and a 0.43 millimeter wall thickness were produced. The large extrusions were not wrapped in foil. These large, extruded green bodies were cut to the desired length and placed on contoured, nonconducting (i.e., wooden) setters and placed into a laboratory dielectric oven with electrodes above and below the ware. The ware remained in the oven for six to ten minutes to completely dry the ware. The ware was rotated 90° part way through the drying cycle to achieve even heating and drying.

The fired samples were tested for overall porosity, pore size, and density. Also, micrographs and visual observation of the web surfaces and fractured edges was used to evaluate the pore structure. Standard mercury intrusion under high pressure was used to calculate porosity, pore size, and density. As the pressure is increased, the mercury is forced into finer and finer pores allowing a plot of pore size versus porosity to be drawn.

Various base compositions were used in the examples. Table I lists the ceramic-precursors of the various base compositions used in the examples in terms of parts by weight. The base compositions are shown in Table I without the graphite or cellulose additions. Approximate average particle sizes ("APS") are listed in parentheses. All average particle sizes are in microns.

TABLE I

|  | A | B | C | D | E |
|---|---|---|---|---|---|
| TALC 95-28 (APS 5-9) | 40.21 | — | — | — | — |
| TALC 95-27 (APS 5-9) | — | 40.78 | 40.78 | 40.78 | 40.78 |
| Calcined Clay (APS 1.5) | 21.17 | 26.48 | 26.48 | 20.00 | 15.00 |
| HYDRITE MP (raw clay) (APS 7) | 25.15 | 15.37 | — | — | — |
| KAOPAQUE-20 (raw clay) (APS 1.5-2.0) | — | — | 15.37 | 15.37 | 15.37 |
| $Al_2O_3$ (APS 4.0-4.5) | 13.47 | 15.34 | — | — | — |
| $Al(OH)_3$ (APS 3.5-4.0) | — | — | 23.42 | 27.97 | 31.48 |
| $SiO_2$ (APS 4.0-4.5) | — | 2.00 | 2.00 | 5.51 | 8.20 |

TALC 95-28 is a talc having a broad particle size distribution (i.e., a larger number of coarse particles) and TALC 95-27 is a talc with a narrower particle size distribution. Both TALC 95-27 and TALC 95-28 are available from Pfizer, Inc., New York, N.Y. HYDRITE MP and KAOPAQUE 20 are available from Georgia Kaolin Company, Elizabeth, N.J.

4.00 parts by weight water soluble methylcellulose and 0.50 parts by weight percent sodium stearate were added to 100 parts by weight of the ceramic-forming precursors as a plasticizer/extrusion aid.

The results of these tests are listed in Table II below.

TABLE II

| Sample # | Base Comp. | Graphite/Cellulose Weight % | Porosity (%) | Pore Size (μm) |
|---|---|---|---|---|
| 1 | A | 30/0 | 49.8 | 8.9 |
| 2 | A | 20/2 | 49.1 | 8.8 |
| 3 | A | 20/5 | 51.6 | 10.7 |
| 4 | A | 30/0 | 49.0 | 9.8 |
| 5 | A | 15/2 | 46.3 | 7.39 |
| 6 | A | 15/5 | 47.2 | 7.28 |
| 7 | A | 10/2 | 44.6 | 6.25 |
| 8 | A | 10/5 | 44.9 | 6.66 |
| 9 | A | 30/0 | 52.1 | 10.30 |
| 10 | A | 20/2 | — | — |
| 11 | A | 20/4 | 47.7 | 7.02 |
| 12 | A | 20/6 | 50.2 | 8.64 |
| 13 | A | 15/4 | 45.6 | 7.31 |
| 14 | A | 15/6 | 49.0 | 8.22 |
| 15 | C | 30/0 | 46.4 | 6.55 |
| 16 | C | 30/0 | 51.8 | 7.21 |
| 17 | D | 30/0 | 53.4 | 6.73 |
| 18 | D | 30/0 | 48.9 | 7.31 |
| 19 | E | 5/0 | 44.2 | 3.56 |
| 20 | E | 10/0 | 46.5 | 4.12 |
| 21 | E | 15/0 | 47.0 | 4.91 |
| 22 | E | 20/0 | 49.2 | 6.11 |
| 23 | E | 0/2 | 44.0 | 3.84 |
| 24 | E | 0/4 | 45.8 | 4.43 |
| 25 | E | 0/6 | 47.0 | 5.26 |

TABLE II-continued

| Sample # | Base Comp. | Graphite/ Cellulose Weight % | Porosity (%) | Pore Size (μm) |
| --- | --- | --- | --- | --- |
| 26 | E | 0/10 | 49.4 | 6.97 |
| 27 | B | 20/0 | 48.6 | 6.76 |
| 28 | B | 25/0 | 52.1 | 10.6 |
| 29 | B | 30/0 | 50.9 | 7.72 |
| 30 | E | 0/0 | 42.1 | 2.55 |
| 31 | E | 5/2 | 46.5 | 3.76 |
| 32 | E | 5/4 | 46.9 | 4.46 |
| 33 | E | 5/6 | 48.2 | 5.67 |
| 34 | E | 5/8 | 49.1 | 6.67 |
| 35 | E | 10/2 | 48.4 | 4.96 |
| 36 | E | 10/4 | 47.4 | 5.55 |
| 37 | E | 10/6 | 52.3 | 7.01 |
| 38 | E | 10/8 | 52.4 | 7.72 |
| 39 | E | 15/2 | 49.3 | 5.36 |
| 40 | E | 15/4 | 51.2 | 6.24 |
| 41 | E | 15/6 | 51.3 | 7.59 |
| 42 | E | 15/8 | 52.3 | 7.36 |
| 43 | E | 20/2 | 51.8 | 6.74 |
| 44 | E | 20/4 | 54.3 | 7.51 |
| 45 | E | 20/6 | 53.2 | 7.49 |
| 46 | E | 20/8 | 55.6 | 8.10 |
| 47 | E | 10/6 | 49.8 | 6.27 |
| 48 | E | 10/8 | 51.8 | 6.78 |
| 49 | E | 15/4 | 51.1 | 5.74 |
| 50 | E | 15/6 | 54.3 | 6.62 |
| 51 | E | 0/8 | — | — |
| 52 | E | 10/6 | 47.9 | 6.02 |
| 53 | E | 20/2 | 50.5 | 6.24 |
| 54 | E | 20/8 | 54.6 | 7.50 |

Table II illustrates that green bodies prepared with a combination of graphite and water insoluble cellulose as a burnout material may be prepared and exhibit the requisite overall porosity and mean pore diameter. No cracking occurred in the samples containing both graphite and cellulose. However, Sample 51, made with only 8 weight percent cellulose and no graphite, cracked badly. Samples 51 through 54 were all large extrusions containing up to 20 weight Percent graphite which were completely dried dielectrically without arcing or shorting occurring.

Samples 1-14 (Base Composition A) indicate that the porosity of the graphite/cellulose containing samples (Samples 2,3, 5-8, 10-14) ranged from slightly below to slightly above the porosity exhibited by Base Composition A with only graphite added (Samples 1,4,9) Pore size tends to decrease with lower levels of graphite, indicating that it is preferable to maintain as high a level of graphite as possible while still preventing arcing or shorting during drying. Analyses of the data regarding Base Compositions B (Samples 27-29), C (15-16), D (Samples 17-18), and E (Samples 19-26, 30-54) indicates that similar results may be obtained with other base compositions.

Samples 55-63 were prepared according to base composition E of Table I with the substitution of an equivalent amount of a coarser talc for the TALC 95-27. Three talc sizes were obtained by screening a coarse talc at 120, 140, and 170 mesh Unit Standard Sieves. The coarse talc used was 99-48 TALC, available from Pfizer, Inc., New York, N.Y. The average particle size of the coarse talc screened at 120 mesh was about 63 μm. The average particle size of the coarse talc screened at 140 mesh was about 58 μm. The average particle size of the coarse talc screened at 170 mesh was about 52 μm. The screened coarse talc was blended in varying ratios with TALC 95-28. In each of Samples 55-63, 20 parts by weight graphite and 10 parts by weight cellulose were added to the modified base composition. The results of the talc substitution on the graphite and cellulose containing batch are listed in Table III below.

TABLE III

| Sample | Talc Coarse/Fine | Talc Sieve | Porosity (%) | Pore Size (μm) |
| --- | --- | --- | --- | --- |
| 55 | 25/75 | 120 | 53.7 | 13.2 |
| 56 | 25/75 | 140 | 53.4 | 12.2 |
| 57 | 25/75 | 170 | 54.3 | 12.3 |
| 58 | 37.5/62.5 | 120 | 51.7 | 15.4 |
| 59 | 37.5/62.5 | 140 | 54.0 | 14.3 |
| 60 | 37.5/62.5 | 170 | 54.3 | 13.2 |
| 61 | 50/50 | 120 | 53.8 | 15.6 |
| 62 | 50/50 | 140 | 54.5 | 15.1 |
| 63 | 50/50 | 170 | 53.5 | 14.0 |

As shown by Table III, the mean pore diameter of the ware may be adjusted by substituting a coarser talc for a finer talc. As the ratio of coarse talc to fine talc increased, the pore sizes got progressively larger. In addition, as the coarse talc fraction changed within each ratio from 120 to 170 mesh (i.e., coarser to finer), the pore size decreased. The pore sizes in each of the samples is in a range suitable to use the ware as a diesel particulate filter.

In summary, graphite may be substituted with water-insoluble cellulose to prevent arcing and/or shorting during dielectric drying of the ceramic article. The use of cellulose in combination with graphite will allow complete dielectric drying while not compromising the overall porosity and pore size requirements for dimensionally accurate ceramic articles desired for use as diesel particulate filters.

Although the invention has been described in detail for the purpose of illustration, it is understood that such detail is solely for that purpose, and variations can be made therein by those skilled in the art without departing from the spirit and scope of the invention which is defined by the following claims.

What is claimed is:

1. A method of making a ceramic article having pores, suitable for use as a diesel particulate filter comprising the steps of:

blending graphite, water insoluble cellulose, and ceramic-forming precursors with an effective amount of vehicle and forming aids to form a plastic mixture;

forming said plastic mixture into a green body;

drying dielectrically said green body; and firing said dried green body under conditions effective to form said ceramic article having pores, wherein said graphite and said water insoluble cellulose are blended with said ceramic-forming precursors, said vehicle, and said forming aids in an amount effective to achieve an overall porosity of 45 to 55% in said ceramic article and to permit drying of said green body to occur with substantially no arcing or shorting.

2. A method of making a porous ceramic article according to claim 1, wherein said blending comprises:

mixing from about 10 to about 25 parts by weight graphite and from about 4 to about 12 parts by weight water insoluble cellulose to 100 parts by weight ceramic-forming precursors to form a precursor blend and adding an effective amount of vehicle and forming aids to said precursor blend to form said plastic mixture.

3. A method of making a porous ceramic article according to claim 2, wherein said precursor blend comprises from about 15 to about 20 parts by weight graphite and from about 8 to about 10 parts by weight water insoluble cellulose to 100 parts by weight ceramic-forming precursors.

4. A method of making a porous ceramic article according to claim 1, wherein said forming comprises:
anisostatically extruding said plastic mixture through a die to form said green body.

5. A method of making a porous ceramic article according to claim 4, wherein said green body is an anisostatically extruded honeycomb, having a matrix of thin walls having a multiplicity of open ended cells extending from a first end to a second end of said honeycomb.

6. A method of making a porous ceramic article according to claim 5, wherein said honeycomb has at least about 8.0 cells per square centimeter.

7. A method of making a porous ceramic article according to claim 5, wherein said pores of said honeycomb have a mean pore diameter of at least about 8.0 μm.

8. A method of making a porous ceramic article according to claim 1, wherein said ceramic-forming precursors are chosen in amounts suitable to form an analytical batch composition by weight on an oxide basis of 9-20% MgO, 30-50% $Al_2O_3$, and 41-56.5% $SiO_2$ and said porous ceramic article consists essentially of cordierite.

9. A method of making a porous ceramic article according to claim 8, wherein said amounts of said graphite and said water insoluble cellulose are about 10 to about 25 parts by weight graphite and from about 4 to about 12 parts by weight water insoluble cellulose to 100 parts by weight ceramic-forming precursors.

10. A method of making a porous ceramic article according to claim 9, wherein said amount of said graphite and said water insoluble cellulose are from about 15 to about 20 parts by weight graphite and from about 8 to about 10 parts by weight water insoluble cellulose to 100 parts by weight ceramic-forming precursors.

11. A method of making a porous ceramic article according to claim 8, wherein said forming comprises:
anisostatically extruding said plastic mixture through a die to form said green body.

12. A method of making a porous ceramic article according to claim 11, wherein said green body is an anisostatically extruded honeycomb, having a matrix of thin walls defining a multiplicity of open ended cells extending along longitudinal axes from a first end to a second end of said honeycomb and having a substantially smaller coefficient of thermal expansion in a direction parallel to said longitudinal axes of said open ended cells than transverse to said thin walls.

13. A method of making a porous ceramic article according to claim 12, wherein said honeycomb has at least about 8.0 cells per square centimeter.

14. A method of making a porous ceramic article according to claim 12, wherein said thin walls of said honeycomb have a thickness of about 0.076 to about 1.27 millimeter.

15. A method of making a porous ceramic article according to claim 12, wherein said thin walls of said honeycomb have a mean pore diameter of at least about 8.0 μm.

16. A method of making a porous ceramic article according to claim 5, wherein said article is a diesel particulate filter, and said process further comprises the steps of:
plugging alternate cells in said honeycomb in a checkered style pattern such that cells closed at said first end are open at said second end; and
refiring said ceramic article to form said diesel particulate filter.

17. A method of making a porous cordierite article comprising the steps of:
blending graphite, water insoluble cellulose, and ceramic-forming precursors in amounts suitable to form an cordierite forming precursors in amounts suitable to form an analytical batch composition by weight on an oxide basis of 9-20% MgO, 30-50% $Al_2O_3$, and 41-56.6% $SiO_2$, with an effective amount of vehicle and forming aids to form a plastic mixture;
anisostatically extruding said plastic mixture through a die to form a green honeycomb, having a matrix of thin wall defining a multiplicity of open ended cells extending along longitudinal axes from one end to another end of said honeycomb and said thin walls having a substantially smaller coefficient of thermal expansion in a direction parallel to said longitudinal axes of said open ended cells than transverse to said thin walls;
drying dielectrically said green honeycomb; and
firing said dried green honeycomb under conditions effective to form said porous cordierite article consisting essentially of cordierite, wherein said graphite and said water insoluble cellulose are blended with said cordierite-forming precursors, said vehicle, and said forming aids in an amount effective to achieve an overall porosity of about 45 to about 55% in said porous cordierite article and to permit said drying to occur with substantially no arcing or shorting.

18. A method of making a diesel particulate filter, comprising the steps of:
blending graphite, water insoluble cellulose, and cordierite-forming precursor in amounts suitable to form an analytical batch composition by weight on an oxide basis of 9-20% MgO, 30-50%, $Al_2O_3$, and 41-56.5% $SiO_2$, with an effective amount of vehicle and forming aids to form a plastic mixture;
anisostatically extruding said plastic mixture through a die to form a green honeycomb, having a matrix of thin walls defining a multiplicity of open ended cells extending along longitudinal axes from a first end to a second end of said honeycomb and said thin walls having a substantially smaller coefficient of thermal expansion in a direction parallel to said longitudinal axes of said open ended cells than transverse to said thin walls;
drying dielectrically said green honeycomb;
firing said dried green honeycomb under conditions effective to form a ceramic article consisting essentially of cordierite, wherein said graphite and said water insoluble cellulose are blended with said cordierite-forming precursors, said vehicle, and said forming aids in an amount effective to achieve an overall porosity of about 45 to about 55% in said ceramic article and to permit said drying to occur with substantially no arcing or shorting;
plugging alternate cells in a checkered style pattern such that cells closed at said first end are open at said second end; and
refiring said ceramic article to form said diesel particulate filter.

* * * * *

UNITED STATES PATENT AND TRADEMARK OFFICE
CERTIFICATE OF CORRECTION

PATENT NO. : 5,183,608
DATED : February 2, 1993
INVENTOR(S) : Donald L. Guile

It is certified that error appears in the above-indentified patent and that said Letters Patent is hereby corrected as shown below:

```
Column 7, line 41, "Bickeey-type" should read --Bickley-type--.
Column 9, line 58, "Unit Standard" should read --United States Standard--.
Column 10, Claim 1, lines 16-17, "permit drying" should read --permit
said drying--.
Column 11, Claim 5, line 4, "walls having" should read --walls defining--.
Column 11, Claim 9, line 3, "are about" should read --are from about--.
```

Signed and Sealed this

Twenty-second Day of March, 1994

Attest:

BRUCE LEHMAN

*Attesting Officer*    *Commissioner of Patents and Trademarks*